US007362266B2

(12) United States Patent
Collinson

(10) Patent No.: US 7,362,266 B2
(45) Date of Patent: Apr. 22, 2008

(54) MUTUAL COUPLING METHOD FOR CALIBRATING A PHASED ARRAY

(75) Inventor: Donald L. Collinson, Lafayette, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 250 days.

(21) Appl. No.: 11/005,774

(22) Filed: Dec. 7, 2004

(65) Prior Publication Data

US 2006/0119511 A1 Jun. 8, 2006

(51) Int. Cl.
*H01Q 3/26* (2006.01)
*H04B 17/00* (2006.01)

(52) U.S. Cl. ....................................... 342/372; 242/174

(58) Field of Classification Search ................ 342/368, 342/173–174, 372; 455/115.1, 115.2, 115.3, 455/115.4, 222.1, 226.2, 226.3, 226.4
See application file for complete search history.

(56) References Cited

U.S. PATENT DOCUMENTS 5,657,023 A 8/1997 Lewis et al.
5,864,317 A 1/1999 Boe et al.
5,867,123 A 2/1999 Geyh et al.
6,208,287 B1 * 3/2001 Sikina et al. ............... 342/174

FOREIGN PATENT DOCUMENTS

EP 0805510 A2 11/1997
EP 0805510 A3 3/2000

OTHER PUBLICATIONS

Shipley, C. et al., "Mutual coupling-based calibration of phased array antennas", Phased Array Systems and Technology, 2000. Proceedings. 2000 IEEE International Conference on Dana Point, CA, USA May 21-25, 2000, Piscataway, NJ USA, IEEE, US,May 21, 2000, pp. 529-532.

Aumann H. M., et al. "Phased Array Antenna Calibration and Pattern Prediction Using Mutual Coupling Measurements", IEEE Transactions On Antennas and Propagation, IEEE Service Center, Piscataway, NJ, US, vol. 37, No. 7, Jul. 1, 1989, pp. 844-850.

International Search Report dated Mar. 3, 2006 for related European Application No. EP 05111714.

* cited by examiner

*Primary Examiner*—Thomas H. Tarcza
*Assistant Examiner*—Fred H. Mull
(74) *Attorney, Agent, or Firm*—Plevy Howard, PC

(57) ABSTRACT

A method for calibrating a phased array antenna comprises performing initial measurements of array antenna elements to ensure that calibration measurements are within the linear dynamic range of receive elements contained within the array. The method includes deriving calibration coefficients from a direct measurement of a forced out of phase condition and detection of deep nulls through adjustment of amplitude and phase settings over a range of frequencies of interest.

12 Claims, 13 Drawing Sheets

MUTUAL COUPLING METHOD FOR CALIBRATING A PHASED ARRAY

FIELD OF INVENTION

The present invention relates generally to radar systems and more specifically to a system and method for calibrating phased array antennas.

BACKGROUND

Phased array antenna systems employ a plurality of individual antennas or subarrays of antennas that are separately excited to cumulatively produce a transmitted electromagnetic wave that is highly directional. The radiated energy from each of the individual antenna elements or subarrays is of a different phase, respectively, so that an equiphase beam front or cumulative wave front of electromagnetic energy radiating from all of the antenna elements in the array, travels in a selected direction. The differences in phase or timing among the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives.

Calibration of phased arrays may be performed during the manufacturing process using near-field or far-field sources. Calibration of phased arrays after fielding may be performed using near-field or far field sources, or by internally distributed reference calibration signals. In general the near-field and far-field scanning process for initial calibration can be very time consuming, especially for arrays with large numbers of elements. Often, typical calibration and maintenance procedures require the antenna to be taken out of service or offline in order to undergo phase and amplitude calibration. Hence, recalibration after operational deployment is only performed when necessary to compensate for defective elements, compensate for changes in element performance over time, temperature or other influencing factors, maintain desired radiation pattern characteristics, implement antenna changes, and maintain overall peak performance, for example.

Prior art phased array calibration techniques using a calibrated internally generated and distributed test signal add cost, weight and complexity to the system. Other calibration techniques have used external probes which require external hardware, add cost, weight and complexity to the system and can be subject to multipath reflections and external interference. They may also be unsuitable for tactical equipment.

Still other prior art attempts to overcome the above mentioned problems have involved the use of mutual coupling measurements, whereby the inherent mutual coupling among radiating elements is utilized to perform an on-board, automatic calibration procedure on the array without taking the antenna out of service. Two previous publications disclosing such prior art mutual coupling calibration techniques are entitled “Phased Array Antenna Calibration and Pattern Prediction Using Mutual Coupling Measurements” (Herbert M. Aumann et al., IEEE Transactions on Antennas and Propagation, Vol. 37, No. 7, pp. 844-850, July 1989), and “Mutual-Coupling-Based Calibration of Phased Array Antennas” (Charles Shipley et al., IEEE 0-7803-6345-0/00, pp. 529-532, 2000). With reference to the schematic illustration of FIG. 1 showing elements in a phased array antenna system 100, these prior art calibration measurements utilizing mutual coupling require a transmit element 10 within the array 100 along with symmetrically opposed receiving elements 20, 30 having equal amplitude and phase mutual coupling to element 10. The amplitude and phase of the transmit signal from element 10 is received sequentially by elements 20, 30 in their zero amplitude and phase bit settings. Based on the relative measurements, transfer functions are then calculated relating the gain and phase of elements 20 and 30. The calibration coefficients for the phased array antenna system are then derived based on the determined transfer functions.

However, the prior art includes a number of drawbacks and limitations associated with the present mutual coupling calibration implementations. Calibration measurements require signals within the linear dynamic range of the receive elements. The prior art techniques indicate use of nearest or near neighboring symmetrically opposed receive elements. However, full power transmit signals may not be within the linear dynamic range of near neighboring receive elements, resulting in distorted or ineffective array calibration over a wide band of signal energy levels. In addition, the prior art solutions include accuracy limitations in that neighboring elements may have very closely matching gain and phase values, while the array calibration measurements may be required to resolve intensity differences of fractions of a decibel (dB) or less and phase differences of only a few degrees. A system and method which overcomes the aforementioned difficulties is highly desired.

SUMMARY OF THE INVENTION

A method for calibrating a phase array antenna comprises performing initial measurements of array antenna elements to ensure that calibration measurements are within the linear dynamic range of receive elements contained within the array. The method includes deriving calibration coefficients from a direct measurement of a forced out of phase condition and detection of deep nulls through adjustment of amplitude and phase settings over a range of frequencies of interest.

In one configuration, a method of calibrating at least one element in a phased array antenna comprises determining a radiated energy level associated with a given transmit element in the array; determining a linear dynamic range and signal to noise ratio (SNR) for a receive element in the array for making phase and amplitude measurements within a given accuracy range; and determining a mutual coupling associated with elements in the array based on the determined signal to noise ratio and linearity parameters. For a given element within the array, other elements having a mutual coupling with the given element within the array are identified in accordance with the linear dynamic range and the SNR, to define a calibration region. The method further includes determining a first element within the other identified elements; determining a second element within the calibration region for the first element; and determining a third element within the calibration region for the second element and symmetrically opposite that of the first element relative to the second element. An RF signal is transmitted from the second element while receiving from the first and third elements initial phase and amplitude bit data. The method includes adjusting the phase bit data of the first element until a signal strength null signal is detected, where the adjusted phase bit data corresponds to a relative phase value associated with the first element relative to the third element; and adjusting the amplitude bit data of the first element until a signal strength null associated with the first element is detected, where the adjusted amplitude bit data corresponds to a relative gain value associated with the first element relative to the third element. The calibration coefficients of the phased array are determined based on the relative gain and phase values.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION

It is to be understood that the figures and descriptions of the present invention have been simplified to illustrate elements that are relevant for a clear understanding, while eliminating, for the purpose of clarity, many other elements found in radar systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

According to an aspect of the invention, a method for calibrating a phase array antenna comprises performing initial measurements of array antenna elements to ensure that calibration measurements are within the linear dynamic range of receive elements contained within the array. Calibration coefficients are derived from a direct measurement of a forced out of phase condition and detection of deep nulls through adjustment of amplitude and phase settings over a range of frequencies of interest. In accordance with an aspect of the invention, the method of calibrating the array uses only the Transmit/Receive (T/R) element modules and their inherent control functions without requiring additional hardware or control functions.

Figure 1A:
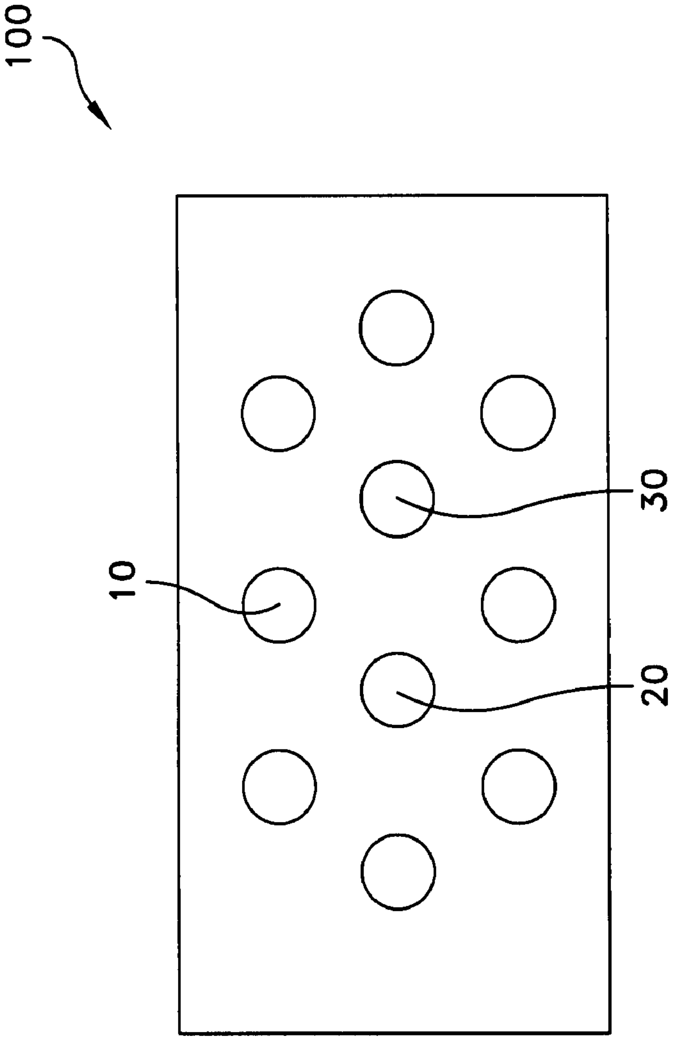
FIG. 1*a* is a front view of an aperture of a phased array antenna system of 10 elements.
Figure 1B:
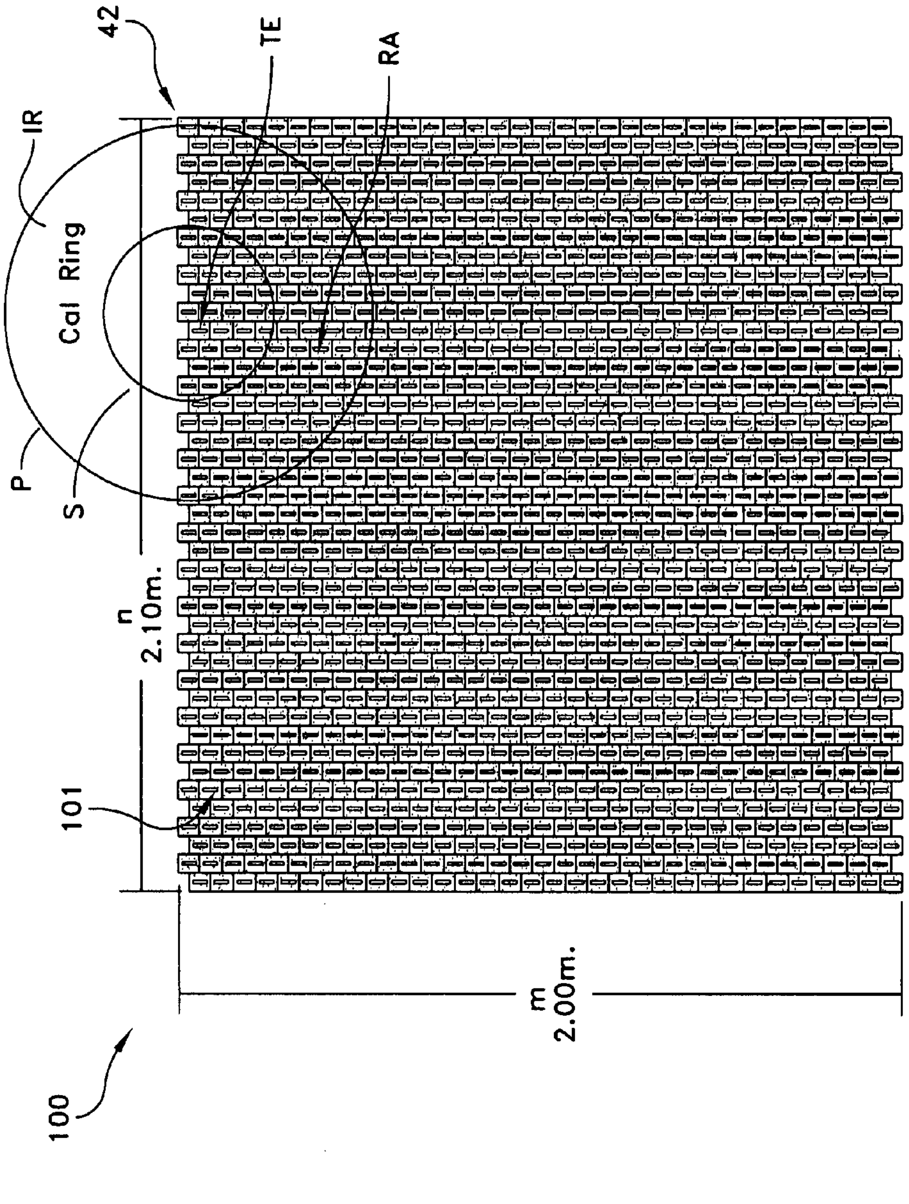
FIG. 1*b* is a front view of an aperture of a phased array antenna system of m×n elements.
Figure 1C:
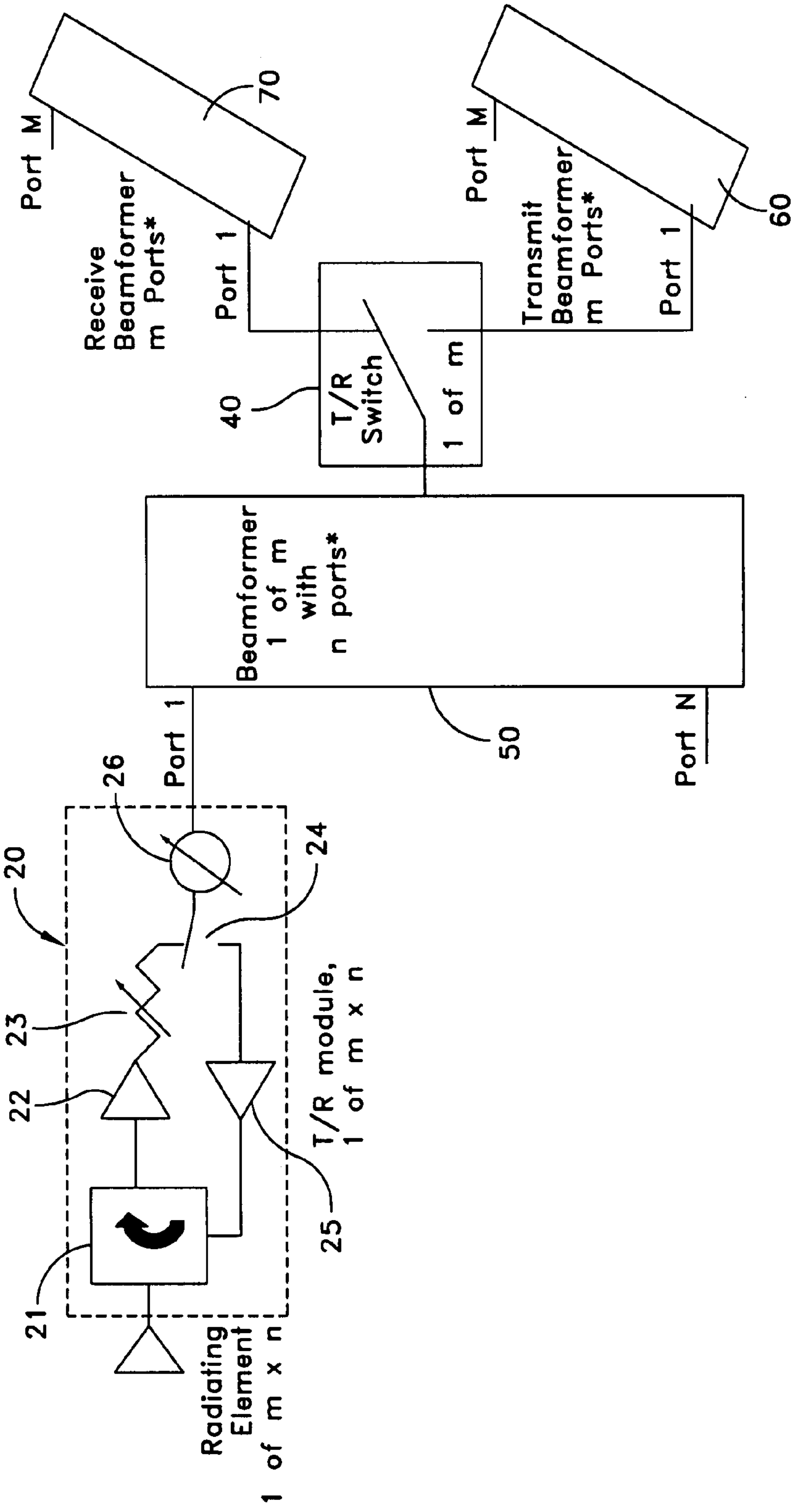
FIG. 1*c* is a schematic illustration of a phased array architecture useful for performing the calibration operations associated with the principles of the present invention.

Referring now to FIG. 1*b*, there is shown a front view of an aperture of a phase array antenna system 100 shown by way of example and not limitation, as including a rectangular array of m×n antenna elements 101 arranged in rows and columns. The antenna elements are each associated with respective transmit/receive (T/R) modules 20 (FIG. 1C). Each T/R module or element provides the active transmit/receive electronics required to operate the antenna element in transmit and receive mode. As shown in FIG. 1C, each T/R module 20 comprises a circulator 21 coupled to a variable attenuator or amplitude shifter 23 via low noise receive amplifier 22. Phase shifter 26 is switchably coupled via T/R switch 24 to transmit high power amplifier 25 or to variable attenuator 23 for operation in either a transmit or receive mode of operation. The phased array of T/R elements are configured in a regular, periodically spaced grid as illustrated in FIG. 1*b*. This configuration provides for symmetry in determining and utilizing the mutual coupling of the array antenna elements for calibrating the array. Referring again to FIG. 1*c*, there is provided a schematic illustration of a phased array architecture useful for performing the calibration operations associated with the principles of the present invention. The architecture depicts a first level beamformer 50 for distributing/collecting signals in columns first, which are then distributed/collected by a row beamformer. The present invention is also applicable to an architecture which distributes/collects signals on a row basis first. The present invention further contemplates that row and column beamformers may contain multiple signal channels to form multiple simultaneous beams.

Still referring to FIG. 1*c*, T/R switch 40 (1 of m) is coupled between the first level and second level beamformer networks. T/R switch 40 functions to allow transmit drive signals to be sent to only one first level beamformer (in this case a column beamformer), while isolating all other first level beamformer circuits from the transmit chain and retaining their receive functionality. The configuration of these switches causes the system to operate in either a calibration mode or a normal operating mode. For normal operating mode, all m switches connect the first level beamformers 50 to the transmit second level beamformer 60 for transmitting, or all m switches connect the first level beamformers 50 to the receive second level beamformer 70 for receiving. For receive calibration, only one first level beamformer is connected to the transmit second level beamformer and m−1 first level beamformers are connected to the receive beamformer. For transmit calibration, one or at most two first level beamformers are connected to the transmit second level beamformer, and m−1 or m−2 remaining first level beamformers are connected to the receive second level beamformer.

Figure 1D:
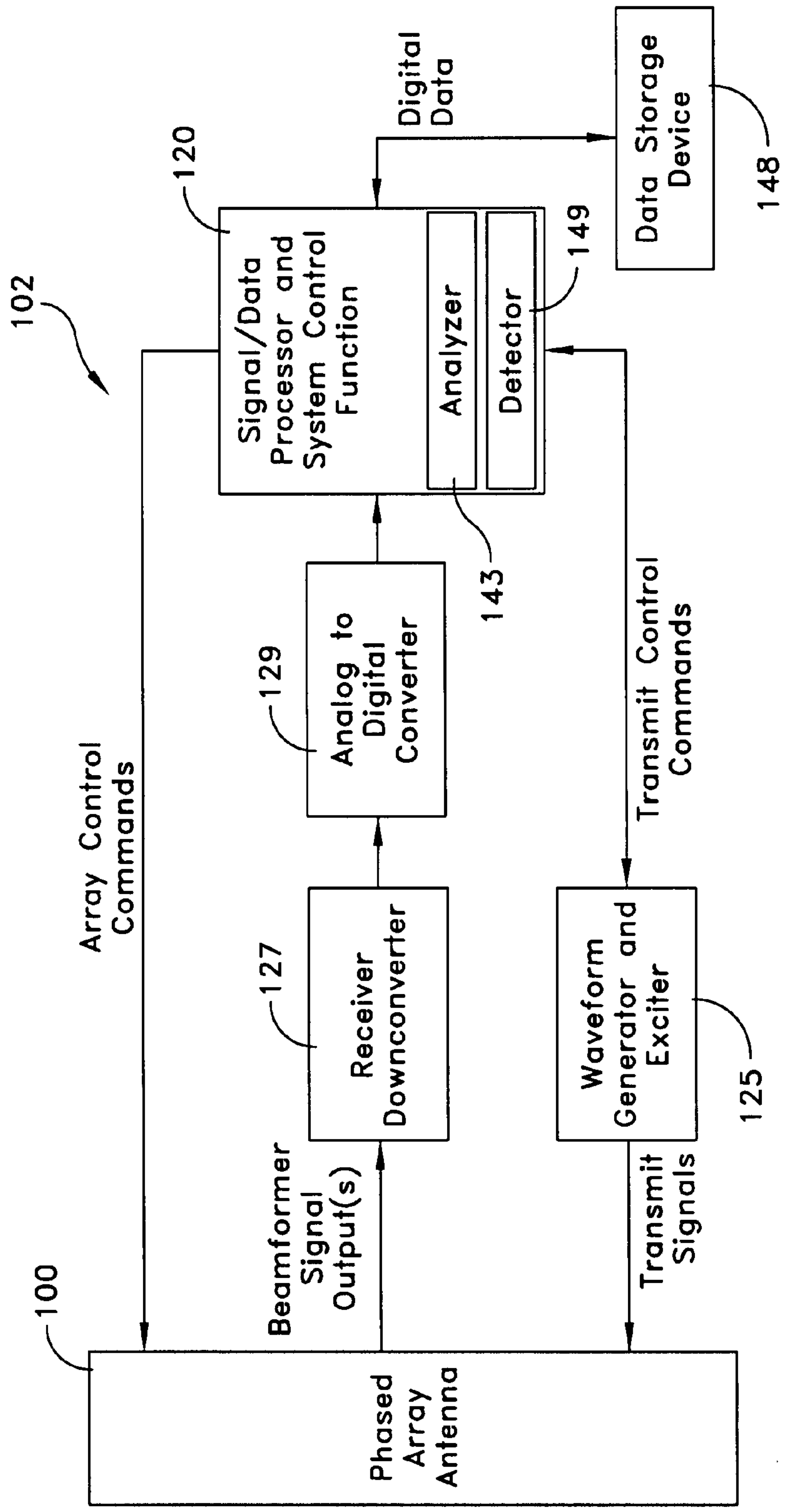
FIG. 1*d* is a schematic block diagram of the main functional components of the phased array antenna system of FIG. 1*c*.

As shown in FIG. 1*d*, there is provided a block diagram 102 of a phased array antenna system according to an aspect of the invention. As illustrated therein signal/data processor and system control function module 120 includes calibration processor control logic for generating array control commands for controlling the transmit and receive functions of T/R modules 20 (FIG. 1*c*) in the phased array antenna assembly 100 including phase shifter 26 and amplitude 23 controls on a per-element basis. Transmit control commands generated from processor 120 are sent to waveform generator and exciter module 125 for transmitting signals to the phased array antenna assembly. Beamformer signal outputs from the array antenna system are down converted by receiver module 127, A/D converted by ADC module 129 and received and processed by processor logic 120. Processor 120 is operatively coupled to memory unit 148 for storing, retrieving and processing array information including calibration data in the form of mutual coupling coefficients, dynamic range and SNR data, transmit power and received signal strength, for example. Processor 120 may also include or be operatively coupled to signal detection circuitry and functionality for detecting and processing the transmitted/received signals, including detection of null conditions and threshold comparisons. Processor 120 may also include or be operatively coupled to performance monitoring and fault detection circuitry for processing and identifying failed or degraded elements for later maintenance or replacement.

As illustrated, the array system includes transmit and receive signal distribution or beamforming networks that are separate or separable in order to maintain signal isolation with each of the transmit and receive antenna element ports. In one configuration, the array system operates by selectively switching and/or isolating the distribution networks so as to enable only one element to transmit while simultaneously enabling only two elements to receive, wherein neither of the receive elements can be on the same row or column as the transmit element.

Figure 2:
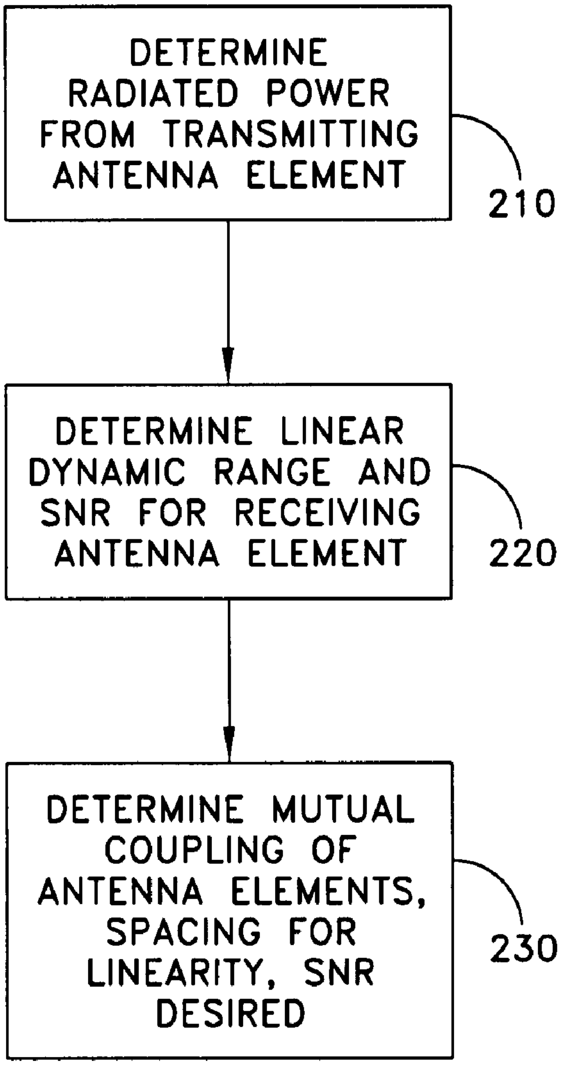
FIG. 2 is an exemplary flow diagram depicting initial processing steps for calibrating the phased array antenna system according to an embodiment of the invention.

Referring now to FIG. 2 in conjunction with FIG. 1, the calibration operation comprises determining a calibration region associated with a given reference element within the array. This is accomplished by first obtaining initial sets of data for performing the calibration process including data based on a determination of the transmit power associated with a given element, dynamic range data, and mutual coupling information. In one configuration, the determined transmit power of each element comprises obtaining the peak or maximum transmit power values provided by each element when in transmit mode (step 210). However, measurements for determining such transmit power may also be obtained through average or mean power values, root mean square (rms) power, or other such mathematical calculations for peak power, for example. Linear dynamic range data associated with each element of the array is also determined by obtaining measurements of received signal data from each element, including Signal to Noise Ratio (SNR) data for obtaining sufficiently accurate phase and amplitude measurements (step 220). This may be obtained by measuring and determining the noise floor for the array elements when in receive mode. The mutual coupling between each of the elements in the array is then utilized to determine the size of the calibration region or ring with respect to a given or selected antenna element, defined as the reference element (step 230).

The initial data for the array element mutual coupling is determined based on the assumption that the array elements are uniformly spaced as shown in FIG. 1*b* and have substantially identical, symmetric radiation patterns. It is also assumed that the array is operative to transmit with one element while simultaneously receiving with another element. As previously mentioned, array control logic 120 includes a controller for controlling the transmit and receive functions including phase shifter and amplitude controls on a per-element basis. The array system further includes transmit and receive signal distribution networks that are separate or separable in order to maintain signal isolation with each of the transmit and receive antenna element ports. The initial data may be determined using factory settings, or may be determined through a series of initial test measurements and selections and stored in memory 148 for later use.

The measured mutual coupling between elements in a phased array also takes into consideration the effects of feed lines such as corporate feeds, power combiners and dividers, and the transmit/receive modules themselves. Factors in determining the mutual coupling include transmit module signal output, transmit/receive insertion losses, linear range values associated with the receive module, receiver discernible signal levels, element spacing distances within the regular array, and overall array size.

In accordance with an aspect of the invention, and with reference to FIG. 1*b* in conjunction with FIG. 2, the calibration process continues by selecting an arbitrary element (e.g. reference element 42 of FIG. 1*b*) in the array (step 204) and, based on the selected element, certain other elements in the array are identified having the coupling values required to meet the dynamic range and SNR requirements determined in steps 201-203 above. The distribution or positions of these other elements in relation to the reference element form the calibration region RA illustrated in FIG. 1*b*.

Figure 3:
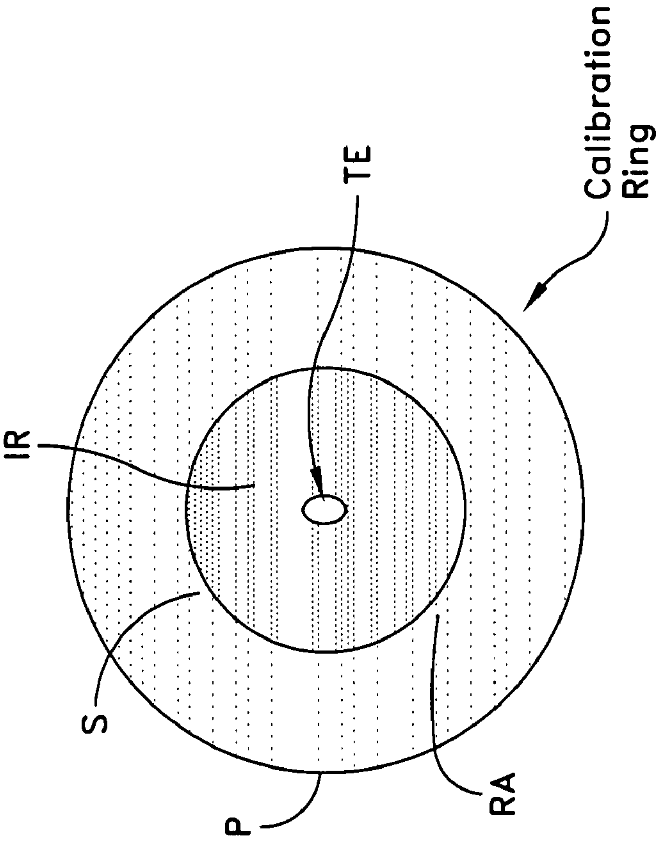
FIG. 3 illustrates determined regions of the phased array useful for performing the processing calibration operations shown in FIG. 2.

FIG. 3 provides a more detailed illustration of the calibration region RA depicted in FIG. 1*b*. Referring now to FIG. 3, calibration region RA is in the form of an annular ring of array elements that surrounds an interior region or area IR of elements within the array. The calibration region RA (and interior region IR) is formed based on the initial data measurements and in accordance with the selected reference element and a transmit element TE to be selected. As illustrated in FIG. 3, the outer perimeter P of the circle of calibration region RA represents a boundary for performing calibration on antenna array elements. The elements inside the perimeter P of the circle have sufficient SNR for amplitude and phase measurements to be performed thereon. The inner perimeter S of the circle represents the boundary whereby elements outside of perimeter S receive the transmit element TE signal within their linear dynamic range. Accordingly, those elements within region RA can be calibrated using the transmit signal from element TE, which is located in the center of the concentric circles P, S.

Figure 4:
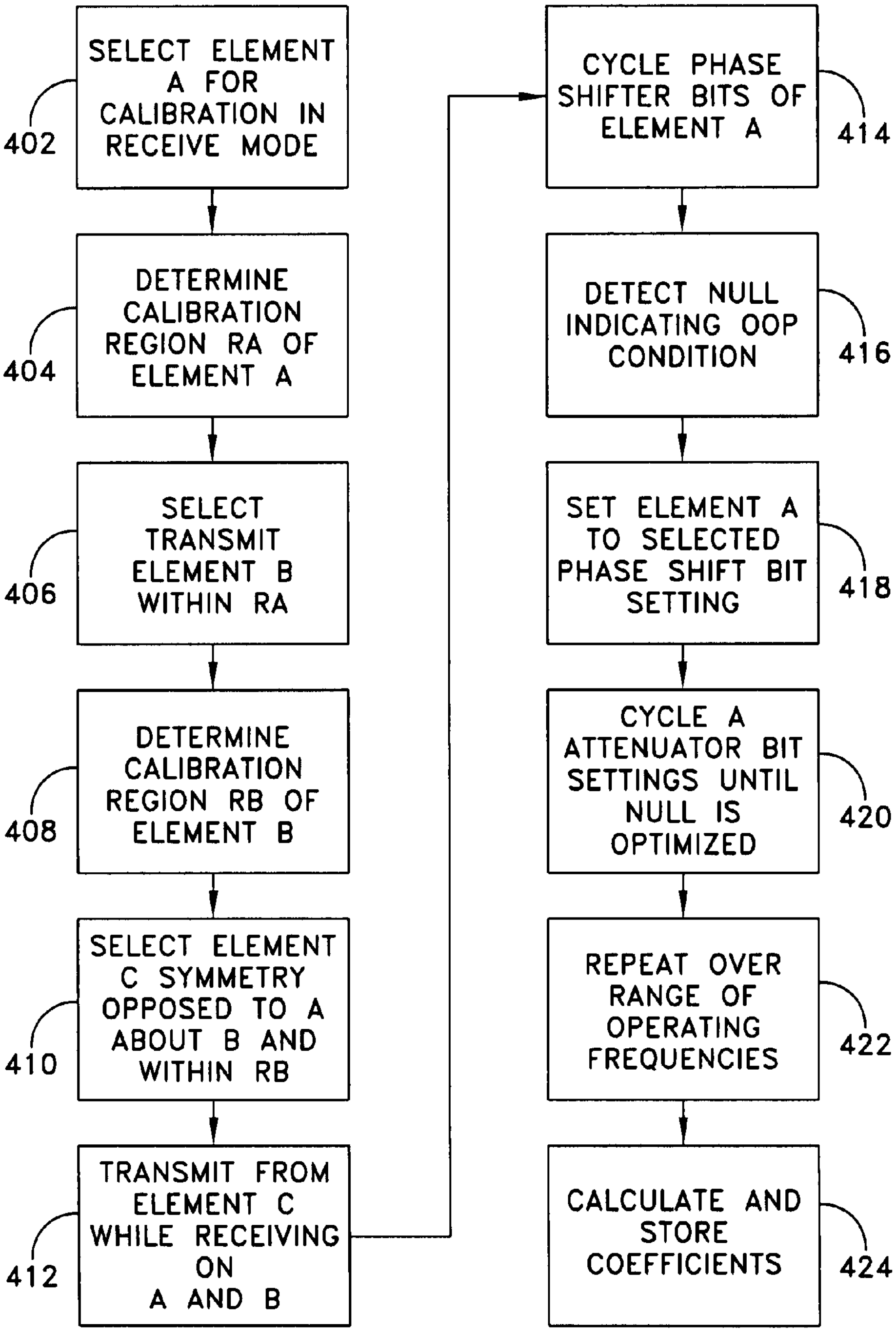
FIG. 4 is an exemplary flow diagram depicting processing steps for calibrating the phased array antenna system in a receive mode of operation according to an embodiment of the invention.
Figure 5:
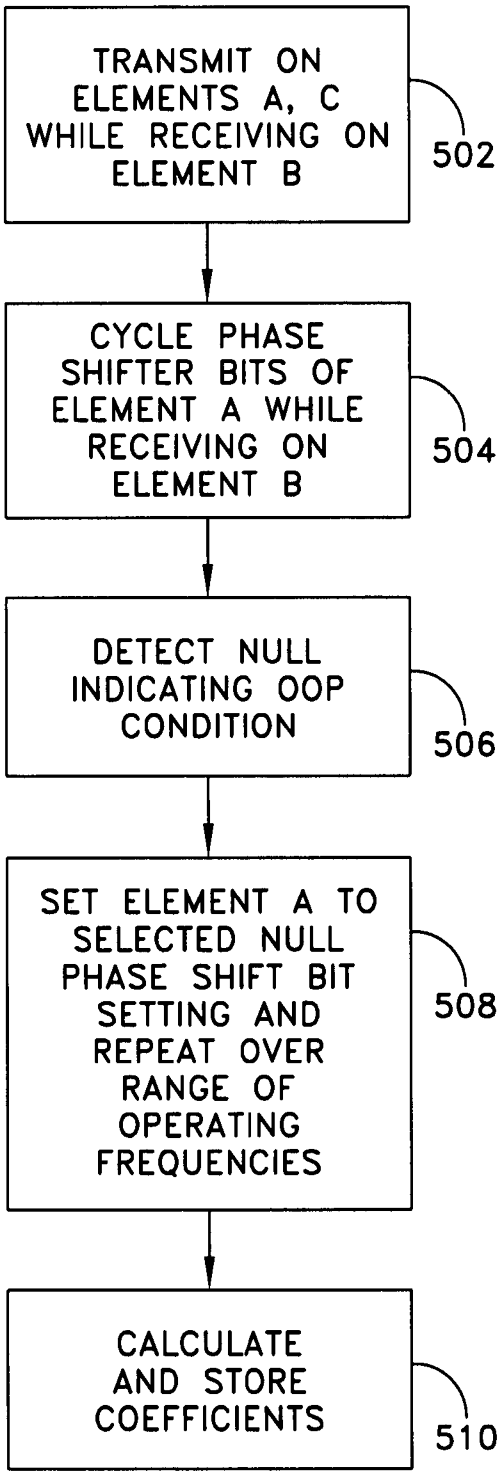
FIG. 5 is an exemplary flow diagram depicting processing steps for calibrating the phased array antenna system in a transmit mode of operation according to an embodiment of the invention.
Figure 6:
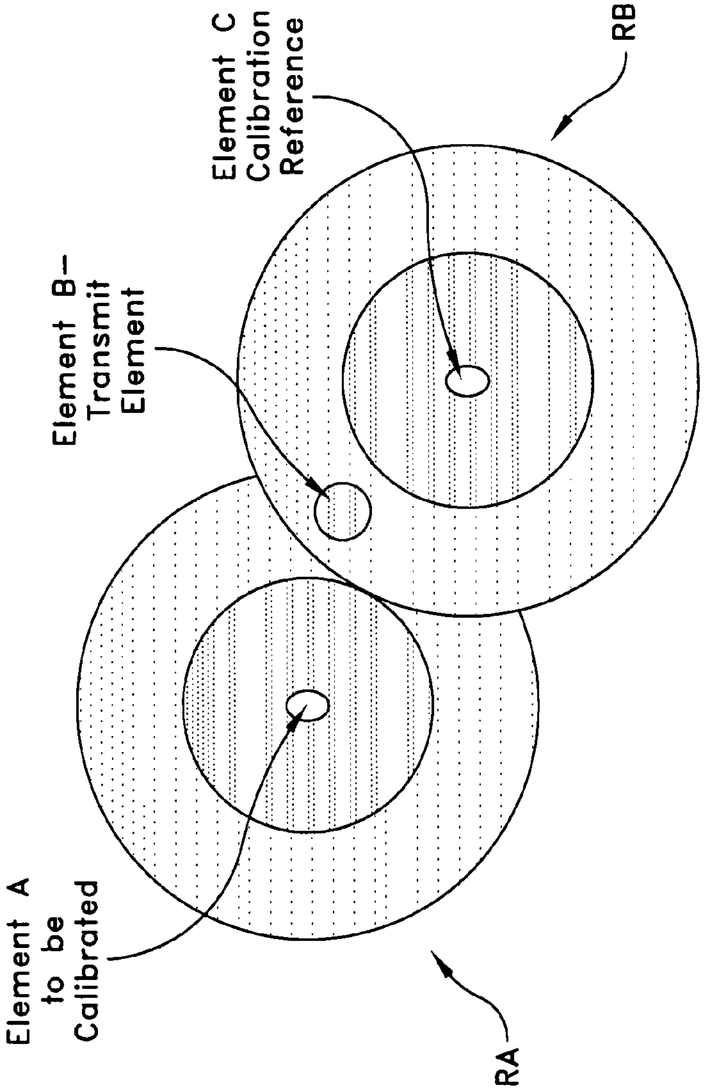
FIG. 6 illustrates multiple determined calibration regions within a phased array antenna system useful for calibrating the array according to an embodiment of the invention.

Referring now to FIG. 4, in conjunction with the drawings of FIG. 1*b* and FIG. 6, operation of the array system in a receive calibration mode occurs by selecting an element (A) to be calibrated in receive mode (step 402). Based on the position of element A selected for calibration, the corresponding calibration region RA associated with element A is determined (step 404) and a transmit element (B) is selected that lies within the calibration region RA for calibration element A (step 406). The corresponding calibration region RB associated with element B is determined (step 408). A receive element (C) within the calibration region RB for element B and that is symmetrically opposed to Element A about Element B is selected (step 410).

The calibration processor 120 then causes the transmit element B to transmit an RF signal while enabling the array system to simultaneously receive at elements A and C in their zero bit phase and amplitude settings (step 412). The received signals from elements A and C are detected via RF detector 149. Processor 120 then cycles phase shifter bits associated with phase shifter 22 of receive element A (step 414) while maintaining the transmit signal from element B until a signal strength null is detected by detector 149. The detected null indicates an out of phase condition (+/−½ bit)

between the elements and relates the insertion phase of element A to element C (step 416). In a preferred embodiment, bit adjustment of phase shifter 22 of receive element A will produce a signal strength null at the detector, the depth of which is dependent on the respective signal gains of the radiating elements and T/R modules 20 associated with elements A and C, respectively. The depth of the signal strength null may be used to infer differences between those respective signal gains.

Upon detection of the null, the phase shifter phase bit setting of Element A is set to that corresponding to the above-detected deep null condition (step 418). Processor 120 then adjusts or cycles the attenuator bits of elements A until a signal strength null is detected by detector 149 (step 420). This relates the gain of element A to that of element C. The operational frequency of the phased array is then adjusted and this cycle (i.e. each of above steps 412, 414, 416, 418, 420) is then repeated over each of the frequencies of operation (step 422). Each time the resulting calibration coefficients are stored in memory 148 for later use (step 424). In this manner element A is receive calibrated to within +/−½ bit of amplitude and phase control and may be used as a reference element to calibrate other elements if its residual amplitude and phase errors are within acceptable limits. In a preferred embodiment, all of the elements of the array would be calibrated using a minimum number of reference elements whose insertion gain and phase are most closely matched to the initial reference element (i.e., those that achieve the deepest nulls in the calibration measurement) in order to minimize the propagation of calibration errors and optimize the calibration.

Calibration for the Transmit mode is then performed utilizing the same three elements, A, B, and C, using C as the reference element. When the array system is operative in calibration transmit mode, processor 120 causes elements A and C to become active transmission elements. Elements A and C simultaneously transmit in their zero bit phase shifter settings while element B operates to receive the transmitted signals (step 502). The received signals are detected at detector 149, and processor 120 generates a signal to adjust the phase shifter bits of transmitting element A while continuing to receive at element B (step 504). The phase shifter bits of Element A are cycled until a signal strength null is detected (step 506), indicating an out of phase condition (+/−½ bit) and relating the insertion phase of element A to element C. The phase shifter setting of element A resulting in the null detection is set (e.g. stored in memory 148). This cycle is then repeated over each of the frequencies of operation (step 508). Each time the resulting calibration coefficients are stored in memory 148 for later use (step 510). In this manner element A is transmit calibrated to within +/−½ bit of phase control and may be used as a reference element to calibrate other elements if its residual amplitude and phase errors are within acceptable limits. In a preferred embodiment, all of the elements of the array would be calibrated using a minimum number of reference elements whose insertion gain and phase are most closely matched to the initial reference element (i.e., those that achieve the deepest nulls in the calibration measurement) in order to minimize the propagation of calibration errors and optimize the calibration.

In accordance with another aspect of the invention, detection and processing circuitry associated with the calibration system is operative to determine the quality of, or the absence of a received signal strength null in either transmit or receive mode. This detection and determination may be used for performance monitoring and fault location purposes in order to identify failed or degraded elements for later maintenance or replacement. For example, based on a comparison of the present values with prior calibration coefficient values and/or detected signal power levels associated with specific elements, the processor 120 may communicate with analyzer module 143 containing detection/determination algorithms and selective threshold processing for determining what portions of the array are not properly functioning and to locate and compensate for degradations resulting therefrom.

As identified in FIGS. 2, 3, 4 and 5, the processor 120 operates in conjunction with memory 148 which comprises an operating system that contains the various execution commands necessary to control the array hardware and its operation. In addition, the processor and memory includes functionality selection adapted to automatically select or transition to a given mode of operation in response to user input, and perform the processing steps associated with the calibration technique described herein.

The processor, memory and operating system with functionality selection capabilities can be implemented in software, firmware, or a combination thereof. In a preferred embodiment, the processor functionality selection is implemented in software stored in the memory 148. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated processors(s), and in the method steps that are undertaken by cooperative operation of the processor(s) on the messages within the communications network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

Figure 7B:
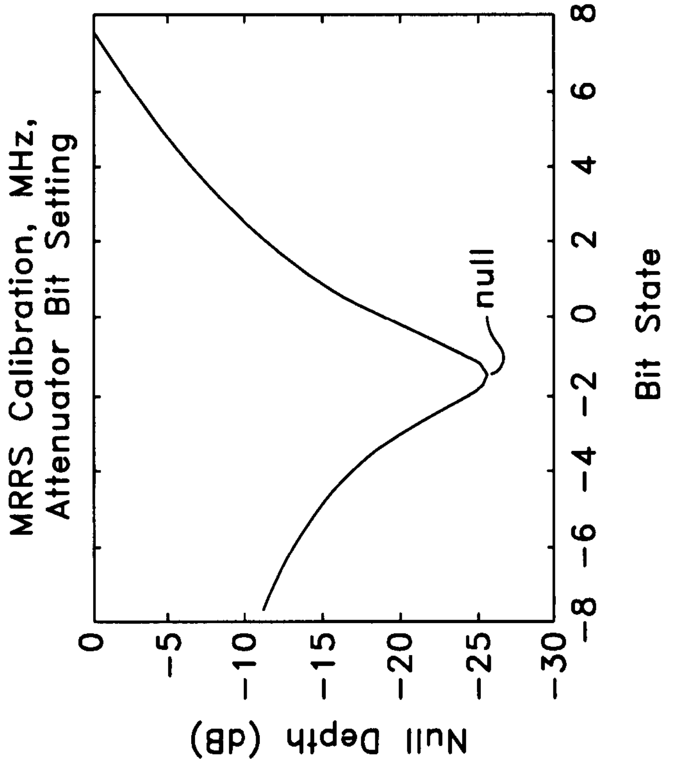
FIG. 7*b* is a graphical illustration of a receive mode calibration operation showing null depth as a function of attenuator bit state.
Figure 7A:
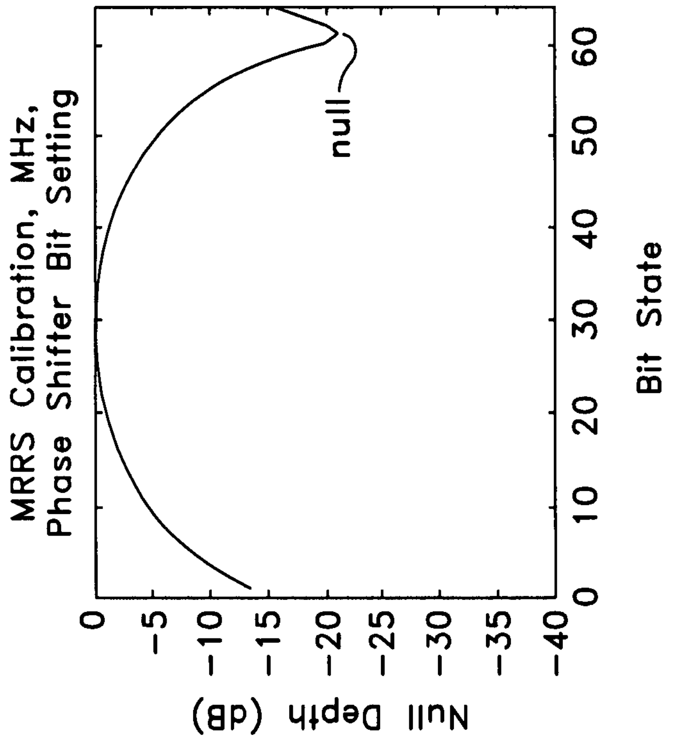
FIG. 7*a* is a graphical illustration of a receive mode calibration operation showing null depth as a function of phase shifter bit state.

As described above and in accordance with the principles of the present invention, the system and method for calibrating a phased array antenna system utilizes the direct measurement of deep signal nulls indicative of a forced out of phase condition associated with certain elements within the array. These forced signal nulls are much easier to detect and resolve than the prior art approaches based on comparative measurements of two elements which may be of nearly equal gain and phase, thereby requiring high resolution measurement techniques. FIG. 7*a* provides a graphical illustration of null depth as a function of bit state for a simulated receive mode calibration of a large array (over 100 elements), while FIG. 7*b* shows a graph of null depth as a function of attenuator or gain bit state. This simulation assumes a 1 dB rms normally distributed gain variation, with fully random and uniformly distributed insertion phases. The phase shifter and attenuator comprise a six bit phase shifter and 5 bit attenuator with 0.25 dB resolution. The results of the simulated calibration included a residual error of about 0.055 dB and 0.94 degrees rms.

Figure 8A:
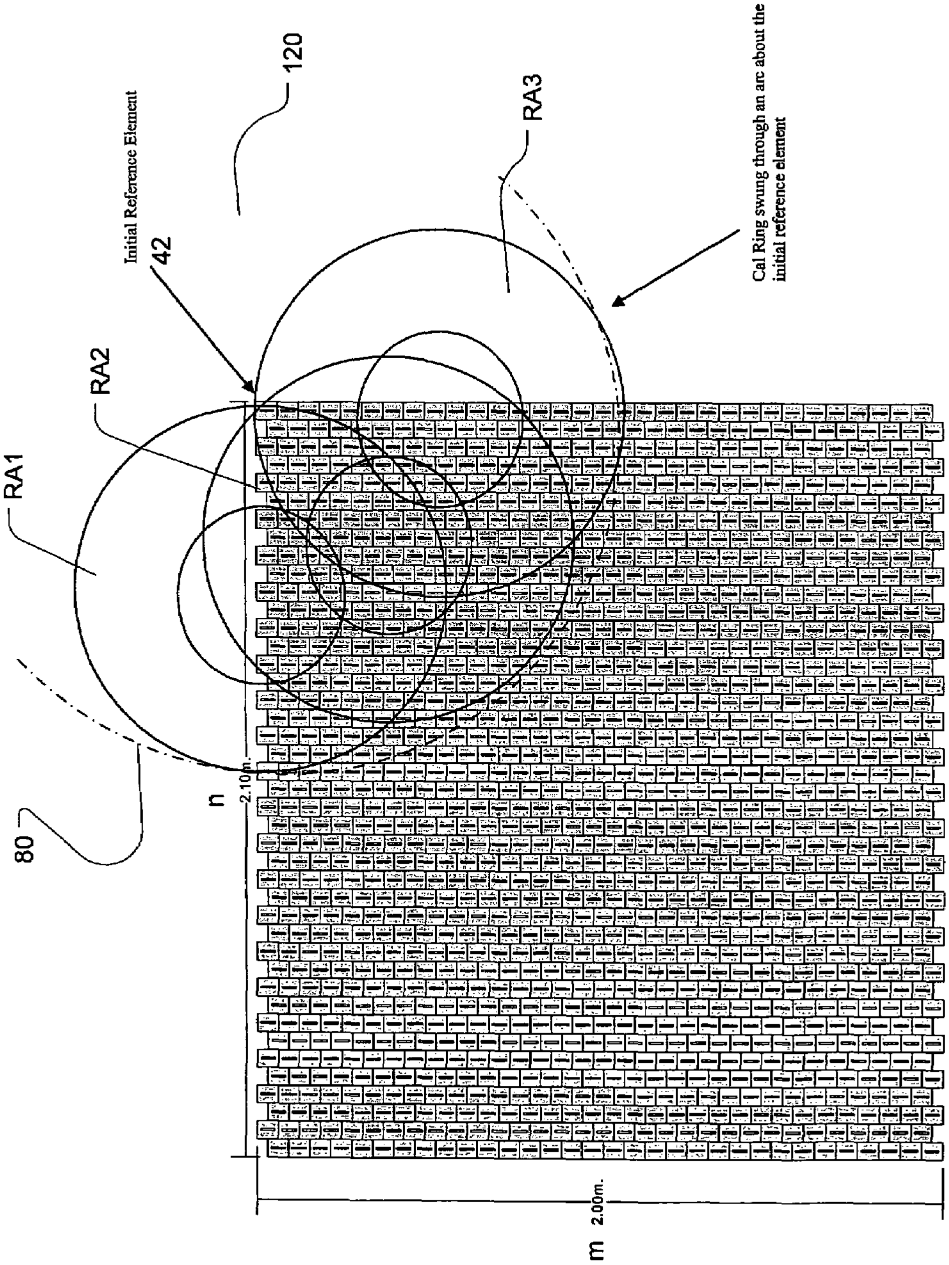
FIGS. 8*a*-8*c* illustrate various calibration regions associated with corresponding reference element selections within a rectangular phased array for calibrating the array in accordance with the principles of the present invention.
Figure 8B:
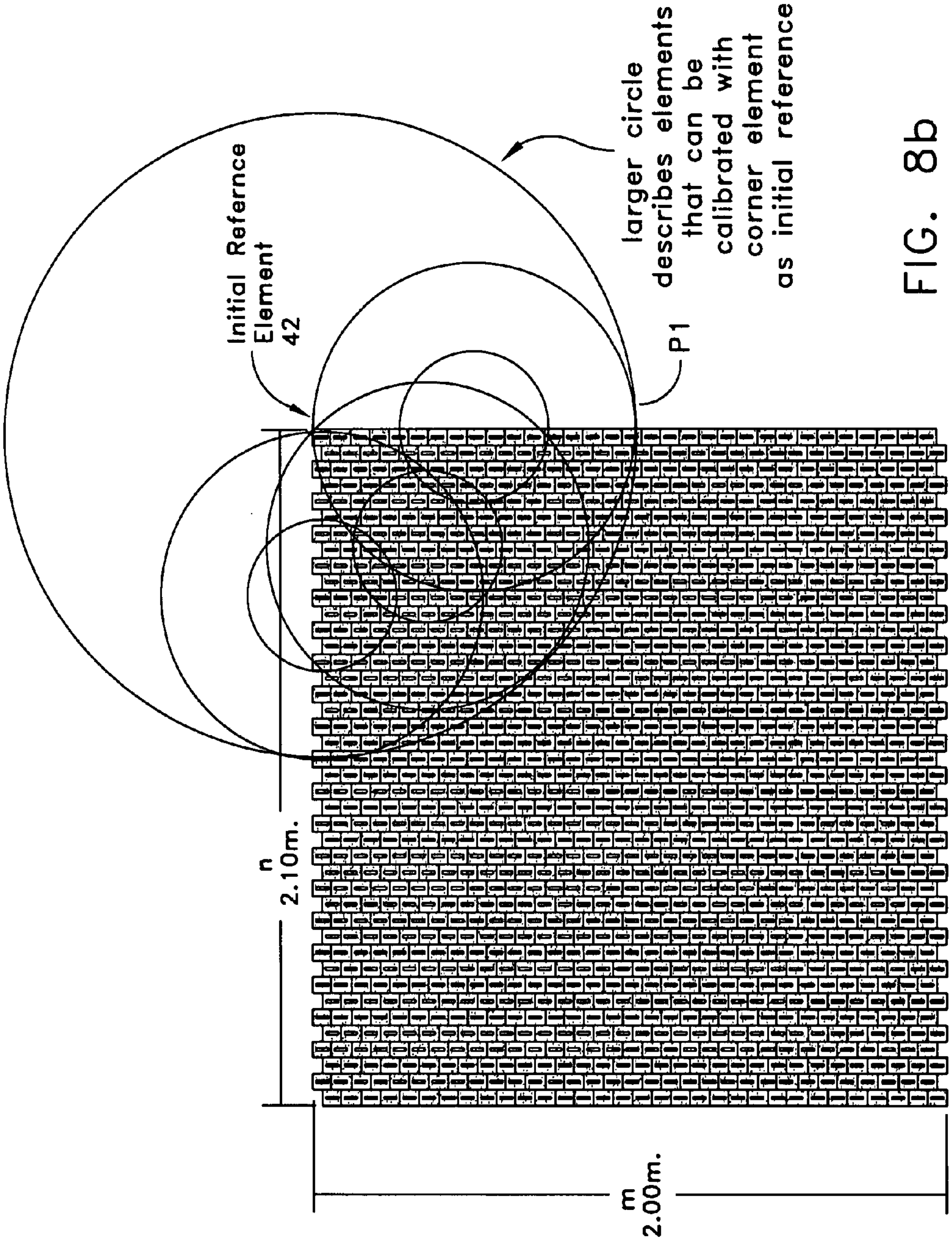
Figure 8C:
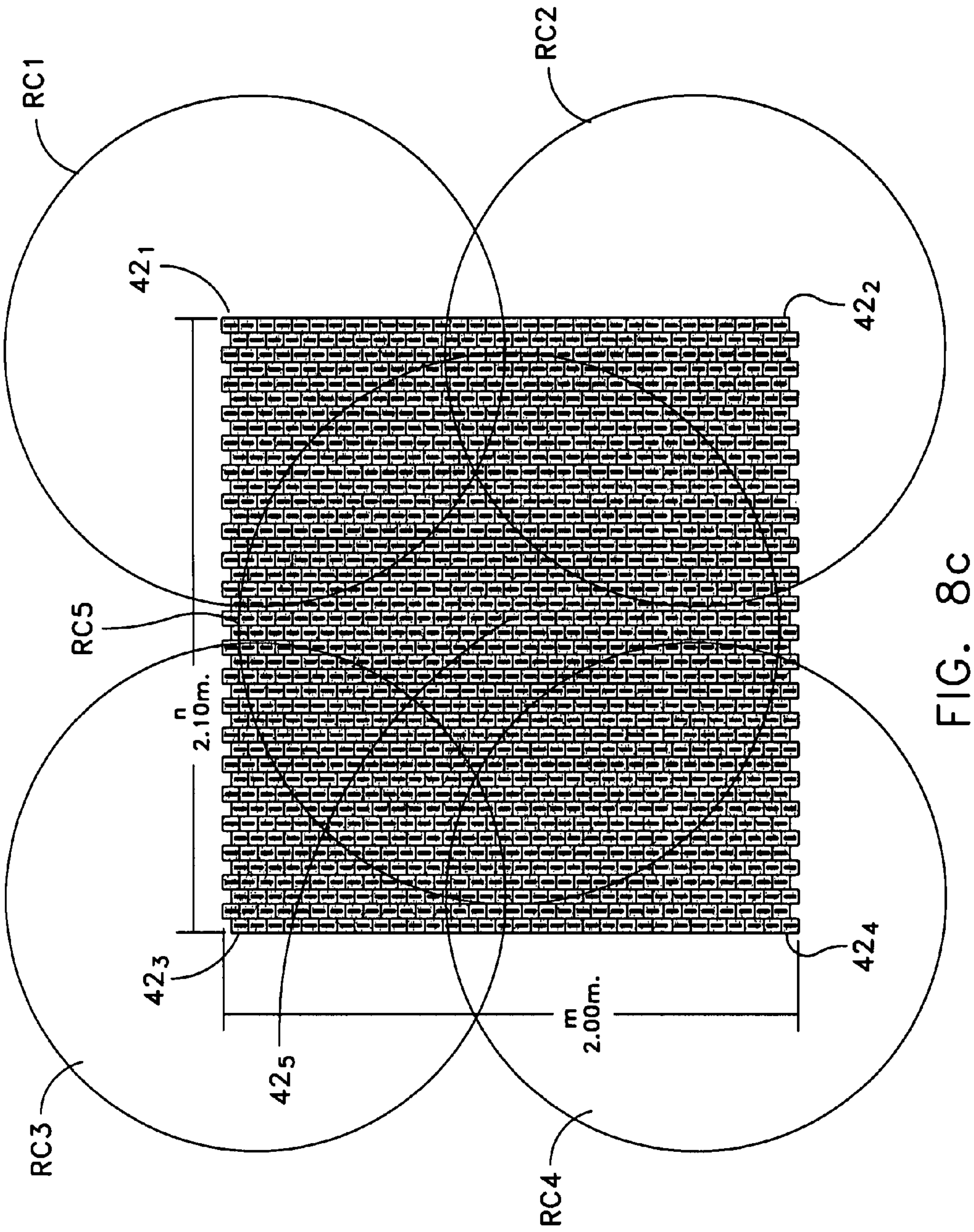

Referring now to FIGS. 8*a*-8*c*, there are shown various calibration regions associated with corresponding reference element selections within a rectangular phased array 100 for calibrating the array in accordance with the principles of the present invention. Referring now to FIG. 8*a*, there is shown a series of identical size calibration regions or rings RA1, RA2, RA3 which are swung through an arc 80 about the initial reference antenna element 42. FIG. 8*b* illustrates the calibration regions or rings RA1, RA2, RA3 of FIG. 8*a* formed inside and defining the perimeter P1 of larger circle member RC. Circle member $RC_1$ defines those elements that can be calibrated using corner element 42 as the initial reference element. FIG. 8C illustrates a series of identical, overlapping circle members $RC_1$, $RC_2$, $RC_3$, $RC_4$, $RC_5$ that together span substantially the entire array 100. In this configuration, the mutual coupling method and system require a minimum of 5 reference elements ($\mathbf{42_1}$, $\mathbf{42_2}$, $\mathbf{42_3}$, $\mathbf{42_4}$, $\mathbf{42_5}$) in order to cover the array. In a preferred embodiment, selection of the initial reference element at substantially the center position of the array 100 (e.g. $\mathbf{42_5}$) is desirable for calibrating the most heavily weighted elements within the phased array antenna system. By selecting a secondary reference within an overlap region of two or more of the circle members $RC_1$, $RC_2$, $RC_3$, $RC_4$, $RC_5$ any residual uncorrectable error is driven toward corners of the array where radiated error power is lower in an array using a tapered illumination for sidelobe control. It is understood that the sizes of the calibration rings in FIGS. 8*a*-8*c* result from a notional analysis of a specific case, and will vary according to the components and element spacing of the array to be calibrated.

In accordance with one embodiment of the present invention, the mutual coupling technique for phased array calibration is implemented with respect to the phased array aperture illustrated in FIG. 1*b*, by utilizing a reference element and element to be calibrated that is greater than 5 columns or greater than 4 rows from the transmit element. The technique disclosed herein further implies that the reference element and element to be calibrated is less than 10 columns or less than 8 rows from a transmit element in order to obtain about 30 dB dynamic range. It is understood, however, that the above-identified parameters are non-limiting examples only, and are not unique to the disclosed calibration method.

The method and system of the present invention identifies those elements that will receive the transmit signal from an arbitrary transmit element within their linear dynamic range with sufficient SNR to make sufficient amplitude and phase measurements. The disclosed method and system relies on the identification of a signal strength null that may be tens of dB deep and much easier to resolve with greater accuracy than prior art methods of calibration. The method and system of the present invention provides a direct measurement of out of phase and equal gain conditions, providing a more direct and more accurate method of identifying correction coefficients.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A method of calibrating at least one element in a phased array antenna, said method comprising the steps of:

a) determining a radiated energy level associated with a given transmit element in said array;

b) determining a linear dynamic range and signal to noise ratio (SNR) for a receive element in said array for making phase and amplitude measurements within a given accuracy range;

c) determining a mutual coupling associated with elements in said array based on said determined signal to noise ratio and linearity parameters;

d) for a given element within said array, identifying other elements having a mutual coupling with said given element within said array in accordance with said linear dynamic range and said SNR, defining a calibration region;

e) determining a first element within said other identified elements;

f) determining a second element within the calibration region for said first element;

g) determining a third element within the calibration region for the second element and symmetrically opposite that of said first element relative to said second element;

h) transmitting an RF signal from the second element while receiving from said first and third elements initial phase and amplitude bit data;

i) adjusting said phase bit data of said first element until a signal strength null signal is detected, said adjusted phase bit data corresponding to a relative phase value associated with said first element relative to said third element; and j) adjusting said amplitude bit data of said first element until a signal strength null associated with said first element is detected, said adjusted amplitude bit data corresponding to a relative gain value associated with said first element relative to said third element;

k) determining calibration coefficients of said phased array based on said relative gain and phase values.

2. The method of claim 1, further comprising the step of setting each of the bit settings corresponding to the detected signal strength nulls in memory.

3. The method of claim 2, further comprising the step of adjusting the operating frequency of the phased array and repeating steps h), i) and j).

4. The method of claim 2, further comprising the step of comparing the detected signal strength nulls with an expected threshold and identifying elements whose detected values exceed said threshold by a predetermined amount indicative of a fault condition.

5. The method of claim 1, further comprising the steps of:

selectively switching transmit and receive modes to cause said first and third elements to transmit RF signals while receiving at said second element phase and amplitude bit data; and adjusting said phase bit data of said first element until a signal strength null signal is detected, said adjusted phase bit data corresponding to a relative phase value associated with said first element relative to said third element.

6. The method of claim 5, further comprising the step of setting the bit phase data setting of said first element corresponding to the detected signal strength null in memory; adjusting the operating frequency of the phased array; and repeating the step of adjusting said phase bit data of said first element in transmit mode until a signal strength null signal is detected for each operating frequency.

7. A computer-readable medium storing computer-executable process instructions for use in a phased array antenna system for calibrating antenna elements, said instructions being executed to perform a process comprising the steps of:

a) for a given element within said array, identifying other elements having a mutual coupling with said given element within a array in accordance with a linear dynamic range and a SNR, defining a calibration region;

b) determining a first element within said other identified elements;

c) determining a second element within the calibration range for said first element;

d) determining a third element within the calibration range for the second element and symmetrically opposite that of said first element relative to said second element;

e) transmitting from the second element while receiving from said first and third elements initial phase and amplitude bit data;

f) adjusting said phase bit data until a signal strength null associated with said first element is detected, said adjusted phase bit data corresponding to a relative phase value associated with said first element relative to said third element; and g) adjusting said amplitude bit data until a signal strength null associated with said first element is detected, said adjusted amplitude bit data corresponding to a relative gain value associated with said first element relative to said third element.

8. The computer-readable medium of claim 7, wherein said process further comprises the step of setting each of the bit settings corresponding to the detected signal strength nulls in memory.

9. The computer-readable medium of claim 8, wherein said process further comprises the step of adjusting the operating frequency of the phased array and repeating steps e), f) and g).

10. The computer-readable medium of claim 8, wherein said process further comprises the step of comparing the detected signal strength nulls with an expected threshold and identifying elements whose detected values exceed said threshold by a predetermined amount indicative of a fault condition.

11. The computer-readable medium of claim 7, wherein said process further comprises the step of:

selectively switching transmit and receive modes to cause said first and third elements to transmit RF signals while receiving at said second element initial phase and amplitude bit data; and adjusting said phase bit data of said first element until a signal strength null signal is detected, said adjusted phase bit data corresponding to a relative phase value associated with said first element relative to said third element.

12. The computer-readable medium of claim 11, wherein said process further comprises the step of: setting the bit phase data setting of said first element corresponding to the detected signal strength null in memory; adjusting the operating frequency of the phased array; and repeating the step of adjusting said phase bit data of said first element in transmit mode until a signal strength null signal is detected for each operating frequency.

* * * * *